United States Patent [19]

Schrader et al.

[11] Patent Number: 5,707,099
[45] Date of Patent: Jan. 13, 1998

[54] WIND NET FOR A CONVERTIBLE ROLLOVER BAR

[75] Inventors: Jürgen Schrader, Weil im Schönbuch; Martin Lorenz, Tübingen; Stephan Orth, Sindelfingen, all of Germany

[73] Assignee: Mercedes-Benz AG, Germany

[21] Appl. No.: 718,936

[22] Filed: Sep. 24, 1996

[30] Foreign Application Priority Data

Sep. 29, 1995 [DE] Germany ................... 195 36 552.6

[51] Int. Cl.⁶ ................................................. B62D 35/00
[52] U.S. Cl. ................................. 296/180.1; 280/756
[58] Field of Search ........................... 296/180.1, 97.1, 296/180.5, 85; 280/756

[56] References Cited

U.S. PATENT DOCUMENTS

| | | |
|---|---|---|
| 4,592,571 | 6/1986 | Baumann et al. ............... 296/180.1 X |
| 4,761,030 | 8/1988 | Boykin . |
| 4,850,637 | 7/1989 | Carlino . |
| 5,211,718 | 5/1993 | Götz et al. . |

FOREIGN PATENT DOCUMENTS

| | | |
|---|---|---|
| 0 340 796 A2 | of 0000 | European Pat. Off. . |
| 88 05 994 | 9/1988 | Germany . |
| 39 13 830 | 11/1989 | Germany . |
| 91 10 304.5 | 2/1992 | Germany . |
| 4119529 | 12/1992 | Germany ............... 296/180.1 |
| 4235416 | 4/1994 | Germany ............... 296/180.1 |
| WO 94/03342 | of 0000 | WIPO . |

Primary Examiner—Joseph D. Pape
Attorney, Agent, or Firm—Evenson, McKeown, Edwards & Lenahan, P.L.L.C.

[57] ABSTRACT

On the cross traverse of at least one convertible automobile rollover bar, a wind net is supported on a span at least approximately the surface between the lateral members of the rollover bar. The upper edge of the wind net rests on an exterior side of the cross traverse in a tensioned manner, and the wind net itself extends down only to approximately the level of the vehicle edge.

13 Claims, 2 Drawing Sheets

WIND NET FOR A CONVERTIBLE ROLLOVER BAR

BACKGROUND AND SUMMARY OF THE INVENTION

The present invention relates to a wind device in the form of a net for a convertible having at least one rollover bar, and more particularly, to a wind device in which the rollover bar comprises two upwardly projecting side members and a cross traverse connecting them and on which a wind deflecting net is supported so as to span at least approximately the surface between the side members and the rollover bar.

DE 39 13 830 A1 and DE 88 05 994 U1 describe a motor vehicle having a rollover bar and a wind blind which can be pulled up from the vehicle floor to span the surface between the side members of the rollover bar, and then be hung into fastening devices existing on the side of the cross traverse of the rollover bar. On the vehicle floor, the blind requires a compartment which is fixed along the width of the vehicle in the transverse direction of the vehicle accommodate the wound-up blind. This blind compartment occupies space on the floor and along the pull-out height over the center width of the vehicle. In four-seat vehicles, it becomes almost impossible for a person to sit in the rear seats.

Furthermore, known wind repulsing devices have nets which are placed over the headrests of the vehicle. The wind repulsing devices cannot take over the function of a wind deflecting device because the flow-through surface between the headrests acting as a barrier is too small for braking the air current arriving thereon from the rear and for also letting it flow through a large surface to avoid a draft.

U.S. Pat. No. 4,850,637 discloses a wind repulsing device which is formed by a net and is placed by hoods over the headrests of a vehicle. A net is mounted between the headrests which, in the case of a sufficient density, can prevent the passing through of a draft but otherwise only insufficiently brakes the passage of a very accelerated air current between the seats by way of the small surface. During the adjustment of the inclination of the backrest or of the headrest position, the headrests influence the tension of the net because of the changing distance to the lower fastening point.

DE 91 10 304 U1 describes a draft repulsing device which is constructed as a hood and is placed over the headrests. This hood made of is to prevent a passing-through of the air current approaching from the rear side in a convertible, in which case the double-wall characteristic is useful. The requirement existing with respect to a wind deflecting device which is to let the passing-through air current flow through in a uniform manner and in the process slow it down to such an extent that the occupants do not feel any draft along the entire surface, cannot be met thereby because the headrests already form a barrier around whose surface the air current is accelerated.

It is an object of the present invention to advantageously fasten a wind deflecting net on a vehicle rollover bar in a functionally advantageous manner.

The foregoing object has been achieved in accordance with the present invention by providing that the upper wind deflecting net edge rests on the exterior side in a tensioned manner against the upper edge of the cross traverse from where the wind deflecting net on one side extends downward only to approximately the vehicle edge, and the lower wind deflecting net edge is fastened in a tensioned manner.

The wind deflecting net device according to the present invention adapts to the conditions on the vehicle determined by the rollover bar in that it only spans the required surface above the vehicle edge behind the vehicle seat or seats with respect to its height, whereby the occupant is protected from air flows and air turbulence.

The rollover bar itself contributes to the fixing of the wind deflecting net of the present invention because the upper wind deflecting net edge rests in a tensioned manner on the exterior side of the cross traverse of the rollover bar. As a result, the wind deflecting net is held on the rollover bar without the requirement of a support in the form of an additional transverse rod on the wind deflecting net. Advantageously, the wind deflecting net is tensioned along the upper transverse edge of the cross traverse whereby it cannot be easily pulled down. Because of the contact on the cross-traverse, the wind deflecting net aesthetically continues the shape of the rollover bar. Because the wind deflecting net reaches from its fastening along the cross traverse only to approximately the level of the vehicle edge, the mounted wind deflecting device uses up no space in the leg area of the vehicle.

The size and the shape of such a wind deflecting device according to the present invention can be adapted to individual rollover bars arranged side-by-side in the vehicle or may span an individual rollover bar which is as wide as the vehicle. Alternatively, it can span the entire vehicle width over two rollover bars situated side-by-side. A secure fastening of the wind deflecting net will be achieved thereby in that the upper tensioned edge of the wind deflecting device follows the course of the upper edge of the rollover bar to its exterior-side member base.

The lower edge of the wind deflecting net, which extends predominantly in the transverse direction of the vehicle, can also be fixed in a braced manner, for example, on a vehicle body wall in the vehicle interior, whereby the wind deflecting device better withstands air turbulence. So that such bracing of the one wind deflecting net edge or of both edges extending largely in the transverse direction of the vehicle does not introduce tension into the entire net surface and therefore result in the formation of folds, the wind deflecting net is reinforced at least in one of the edge areas. This reinforcement can be achieved by a possibly multiple folding over of the net edge or by the fastening of a belt strip extending along the edge. In order to also avoid the formation of folds in the net as well as for visual reasons, the belt strip should consist of only slightly elastic material.

Another feature of the present invention to hold the wind deflecting net in its position also under the effect of air currents consists of providing a tension rope which extends in the center area of the wind deflecting net from an upper wind deflecting net edge while passing through a net-side loop in the downward direction and can be fixed there on a vehicle body wall.

The lower belt strip can simultaneously also be used for storing the wind deflecting net when it is not in use in that the wind deflecting net can be pulled down from the upwardly projecting rollover bar and can be folded in between the belt strip and a then opposite vehicle wall. In addition, of course the entire wind deflecting device can also be removed from its position braced on the rollover bar and can be stored in a space which is very limited for a wind deflecting device.

According to a further aspect of the present invention, a wind deflecting device can be constructed with a wind deflecting net which is placed over the rollover bar in the form of a hood and reaches to the vehicle edge.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
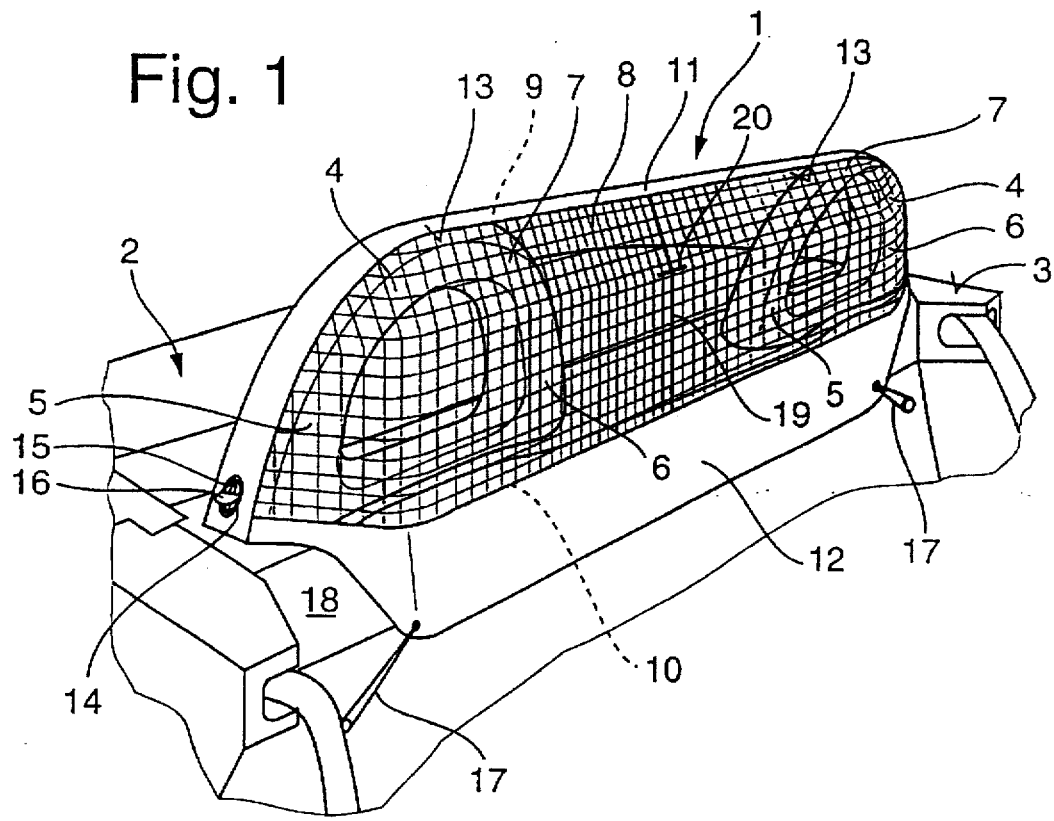
FIG. 1 is a perspective partial view from the occupant side of the rear area of a convertible with a wind deflecting net which spans the rollover bar in the front.
Figure 2:
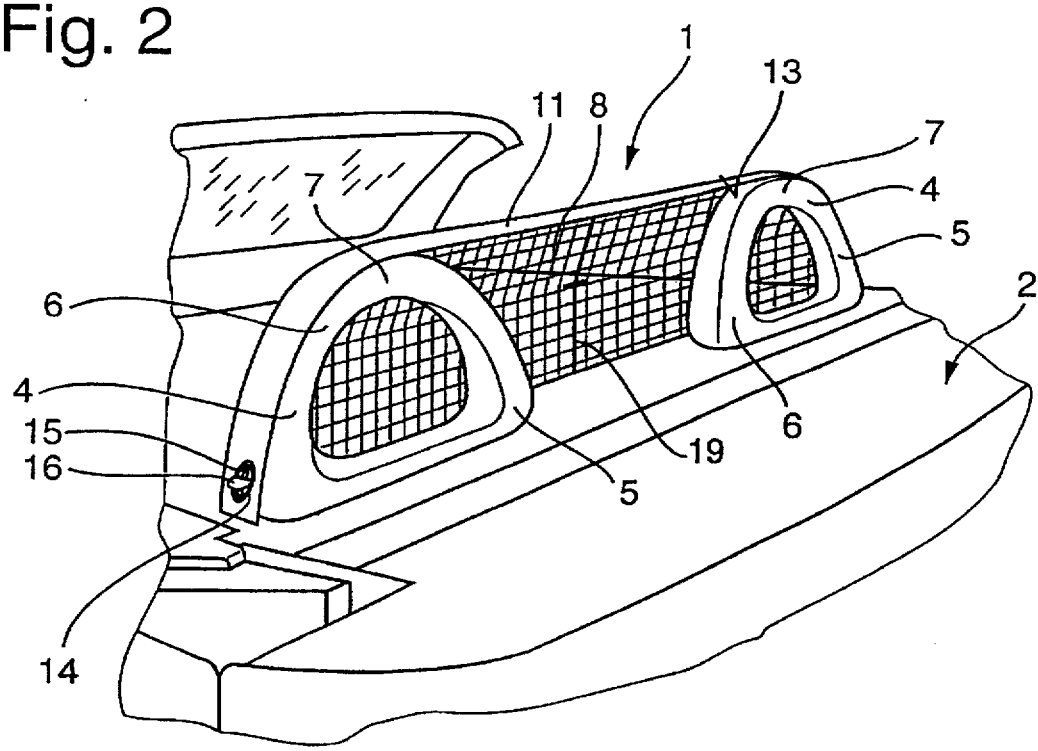
FIG. 2 is a perspective view from the rear side of the wind deflecting net of FIG. 1.

FIGS. 1 and 2 show a wind deflecting device 1 on a convertible 2 shown only in the rear area. Rollover bars 4 project in the upward direction behind the seats, which are not shown here for the purposes of clarity, and are placed on the vehicle body above the vehicle edge 3. Each rollover bar 4 has two spaced side members 5, 6 which point upward and are connected in one piece by a cross traverse 7.

The wind deflecting device 1 comprises a wind deflecting net 8 which, on the upper net edge 9 and on the lower net edge 10, both extending predominantly in the transverse direction of the vehicle, are reinforced by a wide belt strip 11 or 12, which is sewn on. The upper wind deflecting net edge 9 is mounted on the outer side of the cross traverse 7 along the course of the upper edge 13 of the rollover bars 4 over both rollover bars 4 so as to cover, in the front by way of the hanging-down net surface, the surface between the respective side members 5, 6 and, in addition, the surface between the two rollover bars 4 down to the level of the vehicle edge 3.

By virtue of this mounted wind deflecting net 8 the air currents and air turbulence affecting the occupants are reduced in a generally known manner. The net 8 requires little space in its operating position and, when it is not in use, also takes up little storage space.

The simple fastening of the wind deflecting net 8 without an additional rigid frame is implemented by the bracing of the upper net edge 9 around the rollover bars 4 and by the fastening in lateral, releasable locks on or close to the rollover bars 4. For the locking function, a lug 14 is provided here in the upper belt strip 11 and is pulled over an elevation 15 on the rollover bar which fits its shape, after which the rotation of a turning lock 16 locks this fastening. In addition, the lower wind deflecting net edge 10 is also braced on the vehicle in that tension cords 17 fastened on the lower belt strip 12 are hooked onto a vehicle body wall 18 situated behind the vehicle seats. Both belt strips 11 and 12 are made of an only slightly elastic material in order to ensure a good adaptation to the intended position and still prevent a high fold formation in the net surface.

Figure 4:
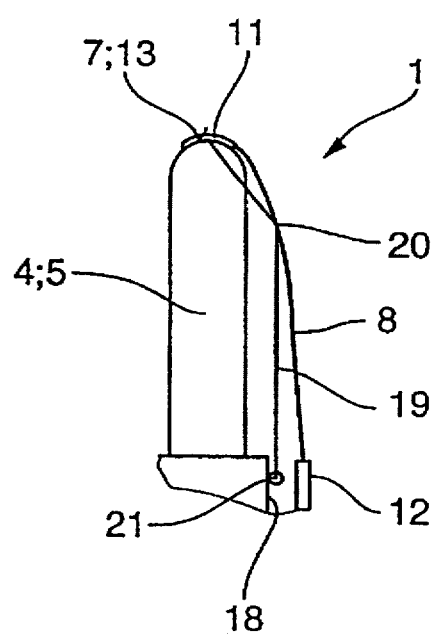
FIG. 4 is a side view illustrating the function of the thin tension rope in the center area.

In order to prevent a fluttering movement of the wind deflecting net 8 in the center area between the two rollover bars 4, a thin tension rope 19 is provided here (as indicated more clearly in FIG. 4), which is fastened on the upper wind deflecting net edge 9 and, while passing through a net-side loop 20 in which the tension rope 19 can be displaced along its height, is guided downward and is fastened there in a releasable manner in a lug on the vehicle body wall 18.

Figure 3:
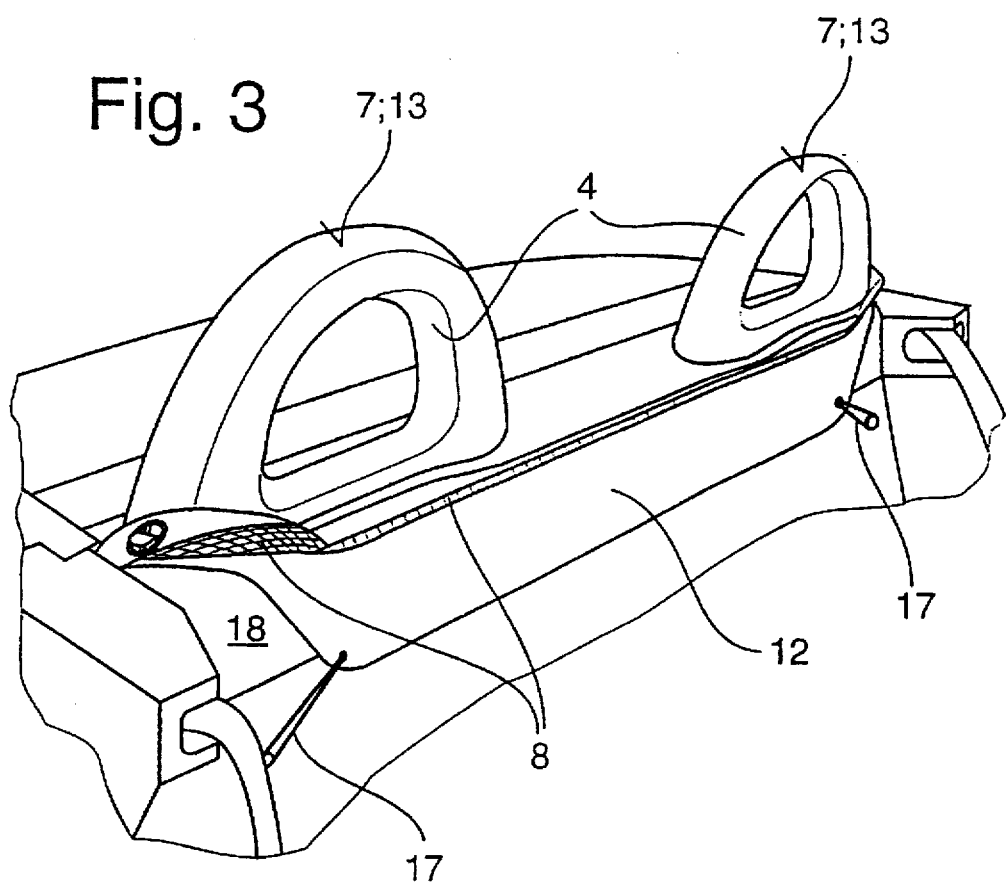
FIG. 3 is a perspective view similar to FIG. 1 but of the folded-together wind deflecting net stored behind an edge-side belt strip.

As illustrated in FIG. 3, the lower belt strip 12 which, extending in the transverse direction of the vehicle, is situated in a braced manner in front of the vehicle wall 18, also has the function of receiving the wind deflecting net 8 between this belt strip 12 and the vehicle wall 18 when the net is not in use. In the latter case, the wind deflecting device 1 therefore remains in its ready position on the vehicle but advantageously uses up only a small space. Because the wind deflecting device 1, as a whole, is easy to fold together and can later also easily be fastened again, however, it can also be stored in the glove compartment or a similar receptacle when it is not in use.

According to another embodiment of the present invention, the wind deflecting device 1 can also be constructed with two parallel net surfaces so that the wind deflecting net can be placed over the rollover bar in the form of a hood which reaches entirely around to the vehicle edge.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Wind deflecting device for a convertible having at least one rollover bar with two upwardly projecting side members and a cross traverse connected therebetween, comprising a wind deflecting net having an upper edge and a lower edge, and being supportable on the at least one rollover bar so as to span at least approximately a distance between the side members in a wind protecting position, wherein an upper edge of the net rests on an exterior side in a tensioned manner against an upper edge of the cross traverse from which the wind deflecting net on one side extends downward only to approximately an upper edge of the convertible, the lower edge is tensionably fastened and means is provided for removing the wind deflecting device from the wind protecting position.

2. The wind deflecting device according to claim 1, wherein at least one edge of the wind deflecting net extending substantially in a transverse direction of the convertible is reinforced.

3. The wind deflecting device according to claim 2, wherein the reinforced net is formed by a fastened belt strip.

4. The wind deflecting device according to claim 3, wherein the fastened belt strip consists of an only slightly elastic material.

5. The wind deflecting device according to claim 3, wherein the wind deflecting device is configured to be tensionably placed by the belt strip in front of a vehicle body wall, and the wind deflecting net is configured and arranged to be storable between the belt strip and the vehicle body wall.

6. Wind deflecting device for a convertible having at least one rollover bar with two upwardly projecting side members and a cross traverse connected therebetween, comprising a wind deflecting net having an upper edge and a lower edge, and being supportable on the at least one rollover bar so as to span at least approximately a distance between the side members in a wind protecting position, wherein an upper edge of the net rests on an exterior side in a tensioned manner against an upper edge of the cross traverse from which the wind deflecting net on one side extends downward only to approximately an upper edge of the convertible, the lower edge is tensionably fastened, and wherein a tension rope is guided from the upper edge and passes through a net-side loop, in a central area of the wind deflecting net, in the downward direction to be fixable on a body wall of the convertible.

7. The wind deflecting device according to claim 1, wherein the wind deflecting net is tensioned over several rollover bars disposed side-by-side along a width of the vehicle.

8. Wind deflecting device according to claim 6, wherein at least one edge of the wind deflecting net extending substantially in a transverse direction of the convertible is reinforced.

9. Wind deflecting device according to claim 8, wherein the reinforced net is formed by a fastened belt strip.

10. Wind deflecting device according to claim 9, wherein the fastened belt strip consists of an only slightly elastic material.

11. Wind deflecting device according to claim 10, wherein the wind deflecting device configured to be tensionably placed by the belt strip in front of a vehicle body wall, and the wind deflecting net is configured and arranged to be storable between the belt strip and the vehicle body wall.

12. Wind deflecting device according to claim 6, wherein means is provided for removing the wind deflecting device a wind protecting position.

13. Wind deflecting device according to claim 6, wherein the wind deflecting net is tensioned over several rollover bars disposed side-by-side along a width of the vehicle.

* * * * *